May 22, 1956 J. T. ZAK 2,746,682
RECTILINEAR SLIDE RULES
Filed Oct. 4, 1952 3 Sheets-Sheet 1
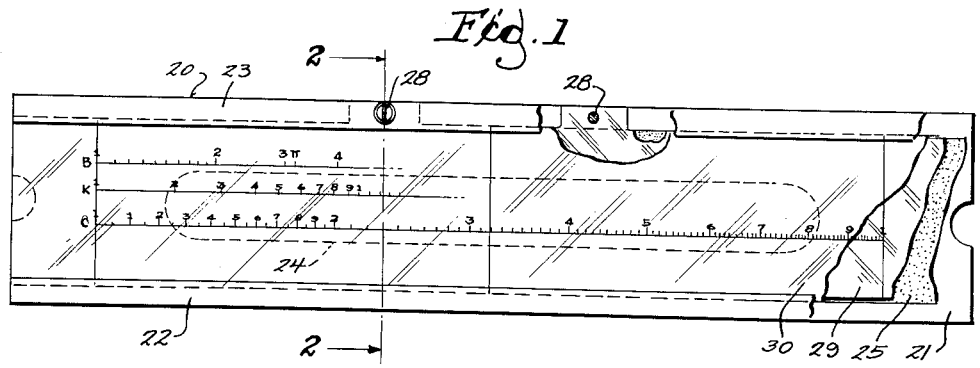
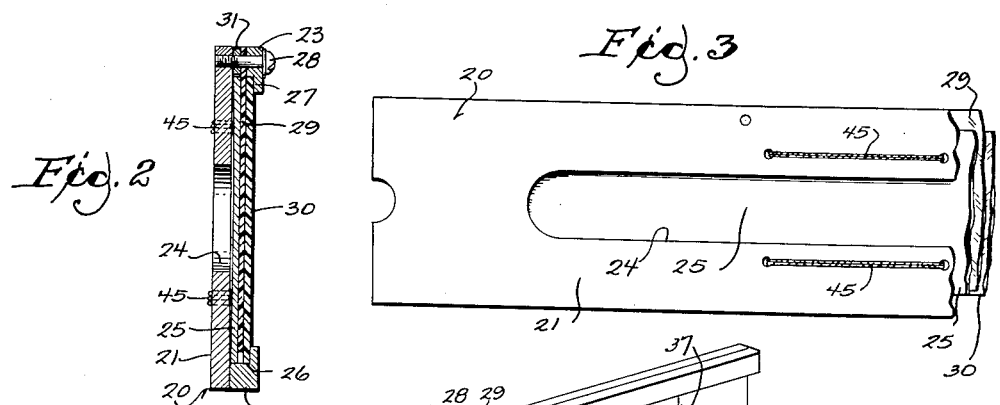
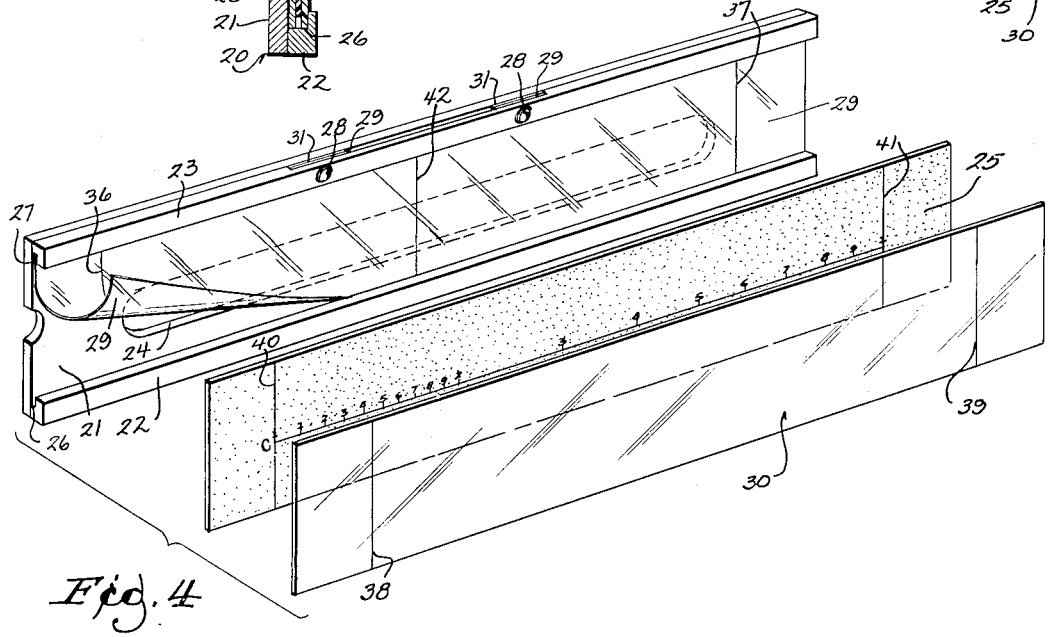
INVENTOR.
JOSEPH T. ZAK
BY
Wheeler, Wheeler & Wheeler
ATTORNEYS May 22, 1956 J. T. ZAK 2,746,682
RECTILINEAR SLIDE RULES
Filed Oct. 4, 1952 3 Sheets-Sheet 2
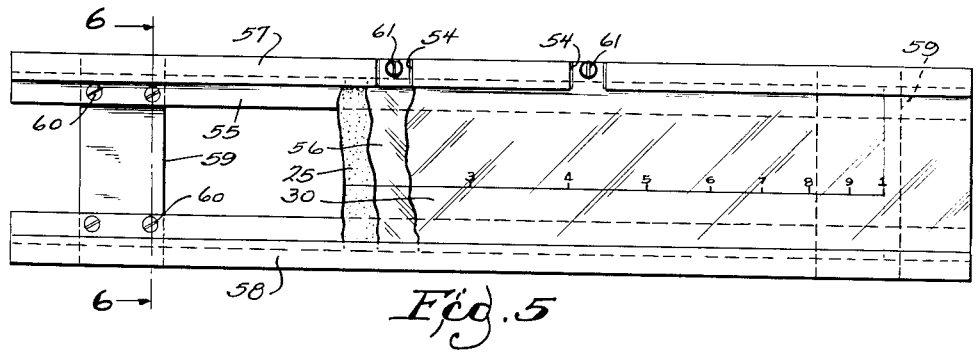
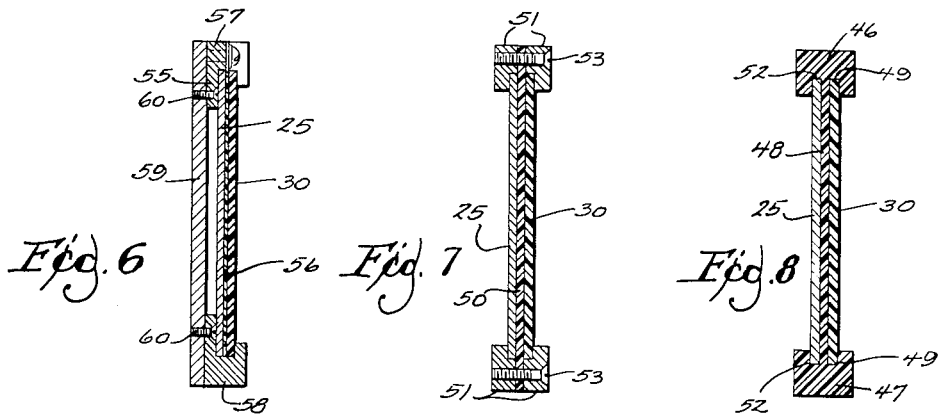
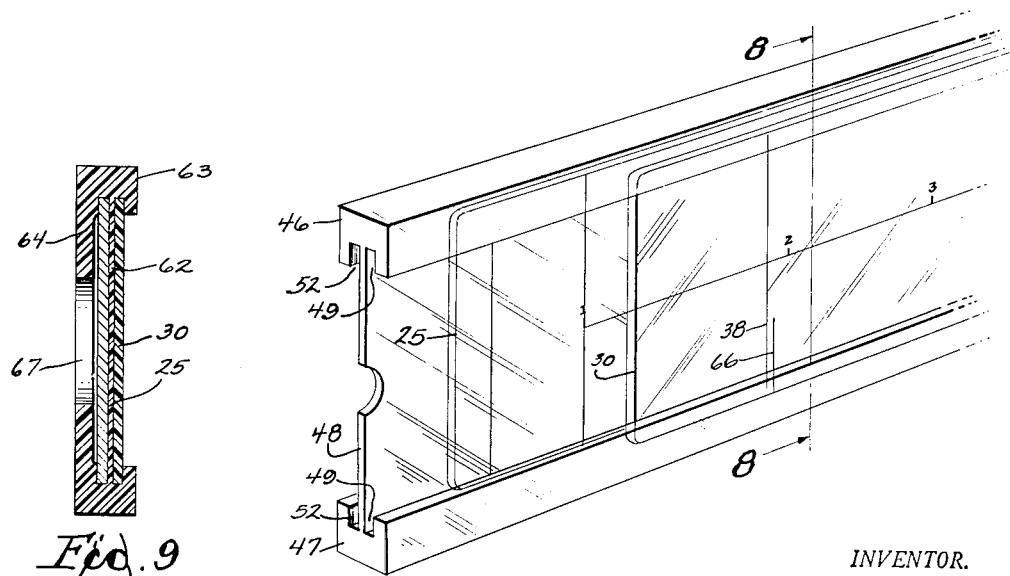
INVENTOR.
JOSEPH T. ZAK
BY
Wheeler, Wheeler & Wheeler
ATTORNEYS United States Patent Office 2,746,682
Patented May 22, 1956

2,746,682

RECTILINEAR SLIDE RULES

Joseph T. Zak, Milwaukee, Wis.

Application October 4, 1952, Serial No. 313,128

12 Claims. (Cl. 235—70)

This invention relates to improvements in rectilinear slide rules.

Of the many types of slide rules in use today two have been universally accepted. These are the conventional rectilinear or stick slide rule of the Mannheim type and the circular slide rule with two indicator arms and a single scale disk. The conventional stick slide rule is commonly preferred because:

1. The scales and graduations inscribed on the slide rule are always properly oriented for easy reading.

2. In the stick slide rule the graduations are not crowded as inevitably occurs near the center axis of the circular slide rule. Thus in the stick slide rule of the same length as the circumference of the circular slide rule, the graduations of each scale are sufficiently spaced for accuracy and easy reading.

3. The stick slide rule is more easily used, carried and stored because of its conventional elongated shape.

4. The stick slide rule has great capacity for many scales within reasonable space limitations. Multiplication of scales in a circular slide rule unduly increases the diameter thereof.

The conventional stick slide rule, however, possesses certain inherent disadvantages which are not to be found in the circular slide rule having two indicator arms and a single scale disk as aforesaid. These disadvantages are:

1. Conventional stick slide rules invariably comprise at least two slidably related scales. Both scales must be initially accurately registered. Any variation in scale size or registration will introduce inaccuracy into the readings taken. Temperature and humidity changes have a tendency to disturb such registration and to render the rule inaccurate. The circular slide rule aforesaid, however, has only one scale disk and all problems are solved by manipulation of the indicator arms. Thus the problem of scale misalignment cannot occur in the circular slide rule aforesaid.

2. In the conventional stick slide rule it is common experience to run off the scale. That is to say that the final or intermediate answer will appear on a portion of one scale out of range of the indicator on the other scale. This requires back tracking in the problem and a new series of manipulations to bring the scale within the range of the indicator. In the circular slide rule the scale is continuous; thus the indicator can never run off the scale.

The circular slide rule with two indicator arms has several further advantages. These are:

1. The operator can perform addition and subtraction problems on the single L scale of equal parts on the circular slide rule. These problems, of course, are incapable of solution on the conventional stick slide rule.

2. Scales need not be repeated on the circular slide rule. For example, there need be no D scale on the circular slide rule as the single C scale, plus the two indicator arms, is sufficient to perform all problems of multiplication and division. The same is true of the A and B scales, etc., which must be duplicated in the conventional stick slide rule. Thus, I effect great saving in size and space in my rule.

3. No folding scales are required in the circular slide rule aforesaid. This is because the circular slide rule scale is continuous and the problem of extra manipulation of the sliding scale of the conventional slide rule is not present in the circular slide rule.

It is the principal object of this invention to combine the advantages of the conventional rectilinear slide rule and circular slide rule of the type having two arms in one instrument. My slide rule takes the physical form of a rectilinear rule, with all of the advantages of a stick type slide rule, but incorporates many of the advantageous features of the circular slide rule. My slide rule is functionally analogous to the circular slide rule aforesaid and provides an equivalent for an endless scale.

As is well understood in this art simple problems of multiplication and division are performed on the circular slide rule having two indicating arms and a single scale disk by establishing in the first setting of the rule a fixed spacing between the independent and non-independent indicator arms of the rule. The next setting of the rule simply involves relative movement of the scale with respect to the fixed arms and reading the answer under the indicator of one of the said arms. This principal of operation is analogous to that of my improved rectilinear slide rule in which I provide two indicators which correspond in function to the indicator arms of the circular slide rule. My indicators, however, are incorporated in a new rectilinear slide rule having a partition and a cursor which are relatively movable respecting a single slide bearing logarithmic scales.

By providing scales on both faces of my slide, and providing additional interchangeable slides, provision is made in my slide rule for solution of a great variety of mathematical problems.

Other objects and advantages of the invention will be more apparent to one skilled in the art upon examination of the following disclosure.

In the drawings:

Fig. 1 is a front view of a slide rule embodying my invention, portions of the slide rule being broken away to expose details of construction.

Fig. 2 is a cross section taken along the line 2—2 of Fig. 1.

Fig. 3 is a fragmentary rear view of the slide rule of Fig. 1.

Fig. 4 is a view in spaced relationship of the various elements of the slide rule of Fig. 1.

Fig. 5 is a front view of another embodiment of my invention, portions being broken away to expose details of construction.

Fig. 6 is a cross sectional view taken along the lines 6—6 of Fig. 5.

Fig. 7 is a cross sectional view of a modified embodiment of the invention.

Fig. 8 is a cross sectional view of a further modified embodiment of the invention, taken along the line 8—8 of Fig. 10.

Fig. 9 is a cross sectional view of a still further modified embodiment of the invention.

Fig. 10 is a view in assembled perspective of the modified embodiment of the invention shown in Fig. 8.

Figure 11:
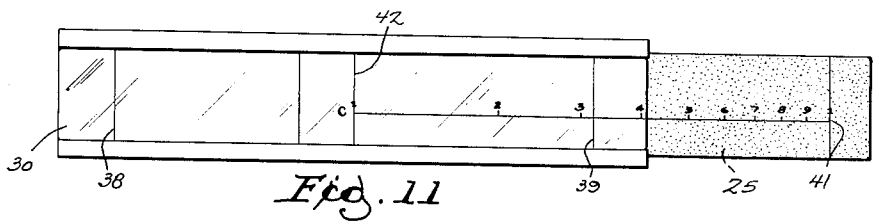
Figs. 11 through 13 show diagrammatically the solution of a simple multiplication problem with a slide rule embodying my invention, using the center line on the partition.

While the preferred form of the invention is shown in Figs. 8 and 10, wherein the partition and frame comprise a single unit which may be extruded, molded or otherwise fabricated in one piece, I will first describe the invention in its form shown in Figs. 1 through 4 in which the parts are separately fabricated. Frame 20 comprises a back plate 21 having grooved bottom and top edge rails 22 and 23. Back plate 21 is provided with a longitudinal slot 24 to provide finger manipulation access to the rear face of my scale slide 25 which has its edge margins engaged in the grooves 26 and 27 of the rails 22 and 23 and is longitudinally slidable therein. Scale slide 25 may bear one or more logarithmic and other slide rule scales. For the purpose of illustration, only a few of these scales are illustrated in the drawings, particular emphasis being placed upon the logarithmic C scale. In the preferred embodiment of the invention the scale slide 25 is the rearmost of the slidable elements and is desirably white and opaque for easy reading of the graduations inscribed thereon.

Securely anchored by means of the bolts 28 between top rail 23 and the top margin of base plate 21 is transparent partition 29. At the portions of the partition under pressure of the bolts I provide a spacer 31 between the rail 23 and base plate 21 to provide a free way for reception and easy sliding of the scale slide 25. Rail 23 is rabbeted at 27 to a depth sufficient to slidably receive cursor 30. As indicated in Fig. 4, partition 24 may be of thin Celluloid or other transparent plastic and desirably extends completely over the scale, its bottom margin desirably projecting into the bottom groove 26. As will be hereinafter explained more in detail the partition may be of much thicker self-supporting plastic material, as in the embodiments of Figs. 8 and 10. On top of the partition 29 I provide a cursor 30 of transparent plastic material having its side margins slidably engaged in the grooves 26 and 27 of the top and bottom rails 22 and 23.

Both the fixed partition 29 and the slidable cursor 30 are provided with left and right indicator lines 36, 37 and 38, 39 respectively. These indicator lines are spaced apart on their respective partition and cursor a distance exactly equal to the distance between the base lines 40 and 41 of the graduations on the scale 25. Accordingly, when the slide rule is assembled and closed, as indicated in Fig. 1, the indicator lines on the partition and cursor register with the base lines on the scale.

The partition may alternately or additionally be provided with an indicator line 42 substantially midway between the positions of indicator lines 36 and 37. As will be hereinafter explained more in detail, and depending on the method of operation selected, either the partition indicator line 42 or the two end lines 36, 37 on the partition are used in cooperation with the cursor indicator lines 38, 39 in manipulating the slide rule. Thus I may fabricate my partition with only the center line 42, with only the end lines 36, 37, or with both center and end lines.

Friction threads 45 are also illustrated in Figs. 2 and 3 and are optionally usable in this embodiment of the slide rule to provide means for adjusting the friction drag on scale slide 25. In other embodiments of the invention, employing other friction means, these threads may be dispensed with.

In the embodiment of the invention shown in Figs. 8 and 10 the top and bottom rails are extruded, molded, machined or otherwise fabricated, integrally with partition 48. Desirably the rails and partition are formed of transparent plastic and together constitute an integral frame to receive the scale and cursor. Partition 48 is considerably thicker than the partition 29 shown in Figs. 1 through 4, as it is relied upon for structural support of the rails 46 and 47. In this embodiment each rail is provided with a groove at each side of the partition, numbered 52 and 49 in the drawing. The grooves slidably receive on one side of the partition the scale 25 and on the other side of the partition the cursor 30, these being substantially identical with those shown in the embodiment of Figs. 1 through 4. The grooves 52 and 49 are initially fabricated of a size to receive the scale and cursor with just sufficient friction to provide for easy sliding of these parts in the grooves.

Fig. 7 shows a slightly different embodiment in which the partition 50 is fabricated separately from the top and bottom rail elements 51, these being secured to the side margins of the partition by bolts 53.

A further modification of the invention is shown in Figs. 5 and 6 in which the partition 56 may again comprise a relatively thin transparent sheet. In this embodiment the top and bottom grooved rails 57, 58 are structurally supported in spaced relationship by longitudinally spaced rear spacer members 59 disposed near the ends of the slide rule. Spacers 59 are secured by means of the bolts 60 to the rear groove walls 55 of the rails, the partition 56 being fastened in suitable notches 54 in top rail 57 by means of the bolts 61. As in the prior described embodiments the scale 25 and the cursor 30 are slidably mounted in the frame at either side of the fixed position partition.

Fig. 9 shows a still further modification of the invention, comparable to that in Figs. 8 and 10 in that the partition 62 is fabricated integrally with the top and bottom rails 63. In this embodiment, however, the partition 62 may be considerably thinner than the partition 48 shown in Figs. 8 and 10 as a back plate 64 is also fabricated integrally with the rails and partition and furnishes structural support for the rails, cursor and scale. Slide scale operating slot 67 may then be cut into back plate 64.

It is desirable, of course, to fabricate the partition as thin as possible to reduce parallax in sighting through the partition. For this purpose base lines 40, 41 and the calibrations are disposed on the front face of the scale, indicator lines 36, 37 and 42 are dispsoed on the rear face of the partition and indicator lines 38 and 39 are disposed on the rear face of the cursor. Moreover, for ease in reading, the indicator lines 36, 37 and 42 on the partition are desirably colored differently from the indicator lines 38 and 39 on the cursor. In practice I have colored the partition indicator lines blue and the cursor indicator lines red.

In Fig. 10 I illustrate, on cursor 30, a simple means to aid the operator in eliminating parallax. A short blue line 66 is inscribed on the front face of the cursor directly above the red line 38. When the observer's eye is perpendicular to the cursor above the indicator line 38 the blue line 66 will conceal that portion of line 38 therebelow. Thus the observer may read the scale graduation under indicator line 38 with complete accuracy.

In all embodiments of the invention, the scale 25 is preferably manipulated by the user's fingers from the rear of the slide rule, although this is not essential to the invention. For this purpose slot 24 is provided in back plate 21 of the rule shown in Figs. 1 through 4, or the instrument has a partially or completely open back as in Figs. 6, 7 and 8. Slot 67 similar to slot 24 of Figs. 1 through 4 is provided in the back plate 64 of the device of Fig. 9.

The cursor 30 is desirably manipulated by the user's thumb from the front of the instrument. The partition, of course, is fixed with respect to the slide rule frame. Accordingly, the scale and cursor are independently movable and once set are not affected by manipulation of the other slidable element. In function my partition is analogous to the non-independent arm of a circular rule and the cursor is analogous to the independent arm of a circular slide rule.

Figure 12:
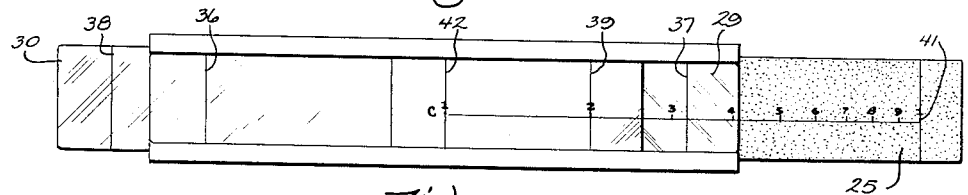
Figure 13:
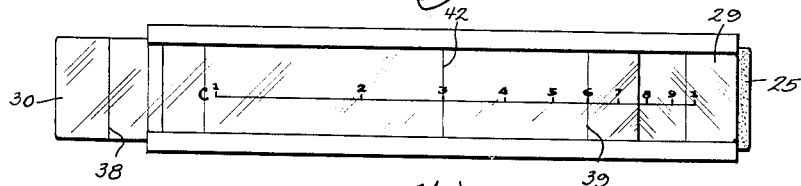

In Figs. 11 through 16 of the drawing I have diagrammatically illustrated two alternate methods of working a simple multiplication problem on my slide rule. In Figs. 11–13 a method is shown in which the center indicator line 42 of the partition is used in combination with the end lines 38 and 39 on the cursor. In the performance of this method the end lines 36, 37 need not be provided on the partition, or if present may be ignored. To multiply any two numbers the scale is first moved so that either of its base lines 40 or 41 registers with the center line 42 of the partition. This setting is shown in Fig. 11. The next step is to move the end line 38 or 39 of the cursor toward which the scale was originally moved over one or the other of the two numbers to be multiplied. For example, to multiply 2×3, line 39 of the cursor may be placed over number 2 on the scale as indicated in Fig. 12. This establishes a fixed distance between indicator line 42 on the partition and indicator line 39 on the cursor which is not changed in the subsequent manipulation of the scale. Scale 25 is then moved, as in Fig. 13, to dispose its number 3 under center line 42 on the partition, the answer 6 being read on the scale under line 39 of the cursor. The answer could be read under either line 39 or 38 depending upon the position to which the scale 25 is moved. For example, if the problem had been to multiply 2×9, the third operation would have been to move the scale until number 9 thereon registered beneath center line 42 of the partition. The answer 18 would then appear on the scale beneath indicator line 38 of the cursor.

This illustrates the fact that in my slide rule, once the settings are established, as aforesaid, one cannot run off the scale. The answer must appear under one or the other of the indicator lines 38 or 39 of the cursor. This advantage must be qualified somewhat by cautioning the operator to always make the first setting of the cursor with the indicator line toward which the scale was initially moved in setting its base line beneath center line 42 on the partition. Thus cursor indicator lines 38 and 39 always straddle center line 42 on the partition as clearly appears in Fig. 12. If, for example, the cursor had initially been moved to the right in Fig. 12, so that its indicator line 38 registered with calibration 2 on the scale, then line 39 would have been positioned beyond the range of scale movement in the next operation of the scale. While the answer in the illustrated problem would have been read then under line 38, it would be possible to run off the scale as for example where the problem is to multiply 2×9. By carefully following the stated sequence, and moving the cursor only so that its end lines 38 and 39 straddle center line 42 on the partition, it is impossible to run off the scale.

Division, as in conventional slide rule operation, is the converse of multiplication and has not been illustrated in the drawing. If 6 were to be divided by 3 the first step would to place 3 on the scale under line 42 on the partition (as shown in Fig. 13). The next step is to move line 39 of the cursor over 6 on the scale, making sure that cursor end lines always straddle center line 42 on the partition. This establishes the fixed distance aforesaid between the center partition line 42 and the cursor lines 38, 39. The last movement is to place either end line of the scale under line 42 of the partition and reading the answer (2) under one or the other of lines 38, 39 of the cursor.

Figure 14:
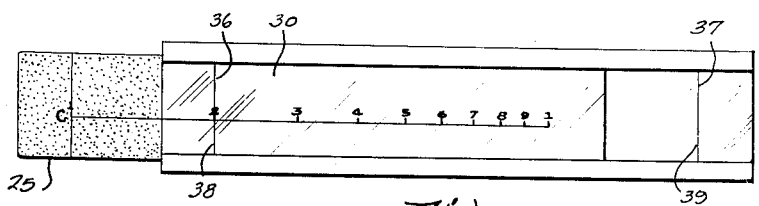
Figs. 14 through 16 are diagrammatic showings of the solution of the same simple multiplication problem using the end lines on the partition.
Figure 15:
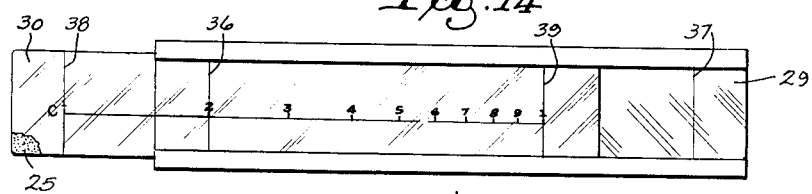
Figure 16:
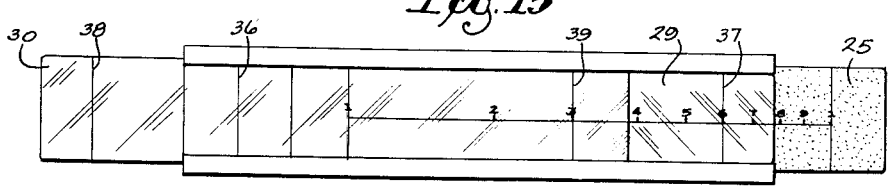

Figs. 14 through 16 diagrammatically illustrate the use of end lines 36 and 37 of the partition (not used in the foregoing method and example) in cooperation with indicator lines 38 and 39 of the cursor for performing a simple multiplication problem. In this system also, if the indicated sequence is followed, one cannot run off the scale. To multiply 2×3, scale 25 is first moved to place number 2 under one or the other of partition end lines 36, 37 (Fig. 14). The next step (Fig. 15) is to close the rule by moving the cursor to register its end lines 38, 39 with the base lines 40, 41 of the scale. This establishes a fixed distance between partition end lines 36, 37 and cursor indicator lines 38, 39 which is not changed in subsequent movements of the scale. The final move is to move the scale to the right until calibration 3 of the scale registers beneath right indicator line 39 of the cursor. The answer (6) is then read under right partition line 37. The preceding sequence demonstrates the following rule of thumb to avoid running off the scale. When the initial setting is under the left indicator line 36 of the partition, the subsequent movement of the scale should be to the right, and conversely if the initial setting of the scale is under the right partition line 37, the subsequent movement of the slide should be to the left. As is also true of the system described in connection with the use of center partition line 42, many mathematical problems can be solved without regard to the particular stated sequence without running off the scale. However, as all problems can be solved without running off the scale if the stated sequences are used, these are preferred in practice.

As in conventional slide rule operation, division, using end lines 36, 37 of the partition, is the converse of multiplication and is not diagrammatically illustrated. For example, to divide 6 by 3, first move 6 on scale under either lines 36, 37 of partition. Cursor 30 is then moved to dispose either of lines 38, 39 over 3 on the scale. This establishes the fixed distance aforesaid between the partition and cursor lines. Closing the rule by moving the scale base lines beneath the cursor lines 38, 39 will bring the answer (2) beneath one of the partition lines 36, 37.

Other specific systems of manipulation are possible but those described illustrate clearly the principle of operation of my slide rule and its analogy with the circular slide rule aforesaid. In both my slide rule and the circular slide rule a fixed distance is first established between the indicator lines on the partition and cursor (non-independent and independent indicator arms on the circular slide rule). The problem is then solved by relative movement of the scale respecting the fixed position indicator lines.

By following the procedures aforesaid one cannot run off the scale and the answer (for simple multiplication and division) may be read under either of the two cursor lines 38, 39, when center partition line 42 is used or under either partition line 36 or 37 when these lines on the partition are used.

As the analogy of my slide rule with the circular slide rule has been established, it is clear that my slide rule can solve all problems for which the circular slide rule is adapted. These will not be further illustrated here as they are well within the comprehension of those skilled in the art. My complete device would, of course, include all those scales currently used in the circular slide rule aforesaid and any special scales that might be required, as well as additional scales used in conventional rectilinear slide rules.

In this connection I intend to supply a scale slide bearing a logarithmic C scale broken into ten or more parallel parts with common base lines at the ends of the said parts. Such a scale, on a ten inch frame, is equivalent to a scale one hundred inches in length and permits accurate readings up to five decimal places. A scale of this length is impractical in conventional stick slide rules because both the stationary and sliding scale would require corresponding broken scales. The conventional rule thus requires twenty rows of "C" scale while my scale requires only ten rows.

I claim:

1. A rectilinear slide rule comprising a frame having a front and a back and openings in said front and back, a transparent partition relatively fixed with respect to said frame and intermediate the front and back, said frame being provided with slideways along said openings, a scale and a transparent cursor slidably mounted in said slideways at opposite sides of said partition and accessible for finger manipulation through said front and back openings for movement along said slideways, said partition and cursor being provided with indicator lines for correlation with the scale.

2. The device of claim 1 wherein said frame and partition are unitary, said scale and cursor being slidable respecting said partition.

3. The device of claim 2 in which said frame and partition are unitarily fabricated, said slideways comprising frame grooves at both sides of the partition to receive said scale and cursor.

4. The device of claim 2 in which said frame comprises a back plate having a longitudinal slot, said scale being disposed between said back plate and the partition for manual manipulation through said slot, said cursor being disposed on the opposite side of the partition for manipulation from the exposed front of the slide rule.

5. The device of claim 2 in which said frame comprises grooved rails mounted on the side margins of the partition.

6. A rectilinear slide rule comprising a frame having a front and a back and openings in said front and back, a transparent partition relatively fixed with respect to said frame and intermediate the front and back, said frame being provided with slideways along said openings, a scale and a transparent cursor slidably mounted in said slideways at opposite sides of said partition and accessible for finger manipulation through said front and back openings for movement along said slideways, said partition and cursor comprising elements provided with indicator lines for correlation with the scale, said scale having spaced base lines, the indicator lines on one of said elements being correspondingly spaced and an indicator line on the other said element being intermediate said spaced lines.

7. The device of claim 6 in which the element bearing the spaced indicator lines is the cursor and the element bearing the intermediate line is the partition.

8. A rectilinear slide rule comprising a frame having ways and a relatively fixed transparent partition element spanning said ways, a scale slidable in said ways at one side of the partition and a transparent cursor element slidable in said ways at the other side of the partition element, said frame constituting a mounting for said partition element, scale and cursor element, said partition element and cursor element being provided with indicator lines correlated with the scale, said scale and cursor element having oppositely disposed faces exposed for finger manipulation whereby said scale and cursor element are slidable with respect to the intervening partition element.

9. The device of claim 8 in which said scale is provided with spaced base lines, the indicator lines on both said partition and cursor elements being correspondingly spaced.

10. The device of claim 8 in which said scale is provided with spaced base lines, the indicator lines on the cursor element being correspondingly spaced and an indicator line on the partition element substantially midway between the ends of said ways.

11. The device of claim 1 in which said frame further comprises spacer elements laterally offset from the path of cursor and scale movement and cross connecting said slideways, said partition being relatively thin to reduce parallax.

12. The device of claim 1 in further combination with means to adjustably impose frictional drag on the movement of the scale.

References Cited in the file of this patent

UNITED STATES PATENTS

| | | |
|---|---|---|
| 1,040,592 | Thomas | Oct. 8, 1912 |
| 2,265,372 | Johnson | Dec. 9, 1941 |
| 2,294,199 | Morse | Aug. 25, 1942 |
| 2,511,270 | Kahan | June 13, 1950 |

FOREIGN PATENTS

| | | |
|---|---|---|
| 370,481 | Germany | Mar. 3, 1923 |
| 379,628 | Germany | Aug. 25, 1923 |
| 77,126 | Switzerland | Aug. 1, 1917 |
| 499,260 | Germany | June 4, 1930 |

OTHER REFERENCES

Page 25 of "Special Slide Rules," by J. N. Arnold. This comprises Bulletin No. 32, published by Purdue University of Lafayette, Indiana, in 1933.